(12) United States Patent
Bayer et al.

(10) Patent No.: US 8,019,848 B2
(45) Date of Patent: Sep. 13, 2011

(54) METHOD AND APPARATUS FOR CONNECTION EXPLORATION IN A NETWORK

(75) Inventors: Gerd Bayer, Stuttgart (DE); Felix Eickhoff, Schoenaich (DE); Onur Keles, Boeblingen (DE); Frank Koeble, Stuttgart (DE); Andreas Koenig, Leonberg (DE); Carl Mayer, Bissingen a.d. Teck (DE)

(73) Assignee: International Business Machines Corporation, Armonk, NY (US)

( * ) Notice: Subject to any disclaimer, the term of this patent is extended or adjusted under 35 U.S.C. 154(b) by 257 days.

(21) Appl. No.: 12/356,723

(22) Filed: Jan. 21, 2009

(65) Prior Publication Data

US 2009/0198810 A1     Aug. 6, 2009

(30) Foreign Application Priority Data

Jan. 31, 2008   (EP) .................................... 08150876

(51) Int. Cl.
*G06F 15/173* (2006.01)
(52) U.S. Cl. ..................................................... 709/223
(58) Field of Classification Search .................... 709/223
See application file for complete search history.

(56) References Cited

U.S. PATENT DOCUMENTS

| | | | |
|---|---|---|---|
| 2002/0080811 A1* | 6/2002 | Wetzel et al. | 370/442 |
| 2003/0208572 A1* | 11/2003 | Shah et al. | 709/223 |
| 2004/0030763 A1* | 2/2004 | Manter et al. | 709/223 |
| 2008/0005406 A1* | 1/2008 | Odom et al. | 710/58 |
| 2009/0290589 A1* | 11/2009 | Green | 370/401 |

\* cited by examiner

*Primary Examiner* — John Follansbee
*Assistant Examiner* — Alan S Chou
(74) *Attorney, Agent, or Firm* — Cantor Colburn LLP; William A. Kinnaman, Jr.

(57) ABSTRACT

An improved method for connection exploration in a network is disclosed, wherein said network includes a plurality of network elements each including at least one port, wherein a globally unique identifier is assigned to each individual port of said network elements, and wherein connected ports of two network elements transfer their globally unique identifiers over a corresponding connection using heartbeat-ordered sequences. The method comprises capturing said transferred globally unique identifiers at receiving ports, storing each of said captured globally unique identifiers at a corresponding receiving port, reading out said transferred globally unique identifiers stored at each port of said network elements using an in-band access, matching said read out globally unique identifiers to a hardware configuration data set to identify connected network elements and connections between said connected network elements, and recording information about existing connections between said network elements.

16 Claims, 4 Drawing Sheets

METHOD AND APPARATUS FOR CONNECTION EXPLORATION IN A NETWORK

CROSS-REFERENCE TO RELATED APPLICATION

This application claims the benefit under 35 U.S.C. §119 of European Patent (EP) application 08150876.4, filed Jan. 31, 2008, and incorporated herein by reference.

BACKGROUND OF THE INVENTION

1. Field of the Invention

The present invention relates in general to the field of network analysis, and in particular to a method and an apparatus for connection or cabling exploration in a network during a computer boot process or during on-line operation.

2. Description of the Related Art

An input/output (I/O) expansion network in a known expandable computing system implements I/O fan-out with multiple I/O hubs and multiple I/O bridges. The I/O hubs are connected to a central processor complex (CPC) via connectors and a fixed board wiring. The I/O bridges located in I/O cages are attached with flexible cables to the I/O hubs located in CPC cages. Pairs of I/O bridges are connected with cables or via board wiring for fail-over redundancy. I/O channels are connected to the I/O bridges via connectors to a back-plane in the I/O cages.

In order to direct requests to the correct I/O channel, software/firmware needs to understand how to put together addresses so that they are routed to the correct I/O channel by the I/O expansion network.

The routing and the associated addresses on a topology that is fixed by connector slots and board wiring can be derived from the actual physical implementation of the wiring. The flexible cables introduce ambiguity in the addressing, since it is not known a priori which I/O bridges are connected to which I/O hubs. This is also true for redundancy connections between I/O bridges if they are implemented as flexible cables.

In said known expandable computing systems, the whole I/O expansion network is implemented with self-timed-interfaces (STIs). For the purpose of finding I/O hub to I/O bridge connections, STI cables contain an extra wire that does not contribute to the high-speed signaling and implies further cabling. Both I/O hub and I/O bridge contain interfaces to drive/receive current over this extra wire. In this environment, an exploration facility assigns unique identifiers for I/O hubs and I/O bridges based on their physical plug location if their presence was detected via side-band accesses. These unique identifiers are stored into a database together with a type to distinguish hubs from bridges. System control firmware then drives a current into the STI cable on an I/O hub and scans through all I/O bridges whether it detects an element receiving the current. The exploration facility then records a connection between the two database entries for the elements which have been found to be connected.

For subnet discovery in an InfiniBand architecture model, all network elements need to be operational at the transport layer, which means layer 4 of the OSI model, in order to receive, interpret queries through so-called subnet management packets by a subnet manager or the exploration facility and respond to these queries with subnet management packets (SMPs).

Internet protocol (IP) based networks requires that all the network elements need to be operational at least at the network layer, which means layer 3 of the OSI model.

SUMMARY OF THE INVENTION

The technical problem underlying the invention is to provide a method and an apparatus for connection exploration in a network, which are able to identify different network elements and corresponding connections at a link layer.

The invention solves this problem by providing a method for connection exploration in a network having the features of the main method claim, and an apparatus for connection exploration in a network having the features of the main apparatus claim. Advantageous embodiments of the invention are mentioned in the subclaims.

Accordingly, in an embodiment of the present invention a method for connection exploration in a network including a plurality of network elements each including at least one port, wherein a globally unique identifier is assigned to each individual port of said network elements, and wherein connected ports of two network elements transfer their globally unique identifiers over a corresponding connection using heartbeat-ordered sequences. The method comprises capturing the transferred globally unique identifiers at receiving ports, storing each of said captured globally unique identifiers at a corresponding receiving port, reading out the transferred globally unique identifiers stored at each port of the network elements using an in-band access, matching the read out globally unique identifiers to a hardware configuration data set to identify connected network elements and connections between the connected network elements, and recording information about existing connections between the network elements.

In a further embodiment of the present invention, the method comprises creating the hardware configuration data set by reading out the assigned globally unique identifiers of all network elements using an out-of-band mechanism, and storing the hardware configuration data set containing the read out globally unique identifiers in a database.

In further embodiments of the present invention, the in-band access is enabled by side-band methods initializing the network elements.

In further embodiments of the present invention, the transferred globally unique identifiers stored at corresponding ports of the network elements are read out in response to a staying up of said in-band access.

In further embodiments of the present invention, the transferred globally unique identifiers stored at the corresponding ports of the network elements are cleared in response to a dropping of the in-band access.

In further embodiments of the present invention, different types of connections can be identified in different scanning procedures in a hierarchical network, wherein in a first scanning procedure all ports of first type network elements are scanned for received globally unique identifiers, and wherein in a second scanning procedure all ports of second type network elements are scanned for received globally unique identifiers.

In further embodiments of the present invention, a primary link from a first type network element to a second type network element in the hierarchical network is identified during the first scanning procedure in response to the received globally unique identifier matching a globally unique identifier of a second type network element as stored in the hardware configuration data set.

In further embodiments of the present invention, a self-coupling link between two first type network elements in the hierarchical network is identified during the first scanning procedure in response to the received globally unique identifier matching a globally unique identifier of a first type network element as stored in the hardware configuration data set.

In further embodiments of the present invention, an external coupling link between the first type network element and another system is identified during the first scanning procedure in response to the received globally unique identifier not stored in said hardware configuration data set.

In further embodiments of the present invention, a failover link between two second type network elements is identified during the second scanning procedure in response to the received globally unique identifier matching a globally unique identifier of a second type network element as stored in the hardware configuration data set.

In another embodiment of the present invention, an apparatus for connection exploration in a network including a plurality of network elements each including at least one port, comprises a support element assigning a globally unique identifier to each individual port of the network elements, and a exploration facility configured to force transceivers of connected ports of two network elements to transfer their assigned globally unique identifiers over a corresponding connection using heartbeat-ordered sequences. The transferred globally unique identifiers are captured at receiving ports, and stored in corresponding registers at the receiving ports, wherein the exploration facility is further configured to read out the transferred globally unique identifiers stored in the registers using an in-band access to each port of the network elements, to match the read out globally unique identifiers to a hardware configuration data set stored in a database to identify connected network elements and connections between the connected network elements, and to record information about existing connections between the network elements.

In further embodiments of the present invention, the support element is configured to create the hardware configuration data set in an early step of an initial machine load by reading out the assigned globally unique identifiers of all network elements using an out-of-band mechanism, and to store the hardware configuration data set containing the read out globally unique identifiers in the database.

In further embodiments of the present invention, side-band methods initializing the network elements enable the in-band access of the exploration facility to the ports and the hardware configuration data set.

In further embodiments of the present invention, the exploration facility is further configured to read out transferred globally unique identifiers stored in registers at corresponding ports of the network elements in response to the in-band access, and to clear the registers storing the transferred globally unique identifiers in response to a dropping of the in-band access.

In further embodiments of the present invention, the exploration facility is further configured to identify different types of connections between the network elements including connectors and/or fixed board wiring and/or flexible cables.

In further embodiments of the present invention, the network has a hierarchical structure including multiple hubs and multiple bridges as network elements, and uses an InfiniBand physical layer, wherein the hubs are connected to a central processor complex via connectors and a fixed board wiring, wherein pairs of hubs are connected via flexible cables, connectors or board wiring for self-coupling, wherein the bridges are attached with flexible cables to the hubs, wherein pairs of bridges are connected with cables or via board wiring for failover redundancy, and wherein the exploration facility is further configured to scan registers of all ports of the multiple hubs for received globally unique identifiers in a first scanning procedure, and to scan said registers of all ports of the multiple bridges for received globally unique identifiers in a second scanning procedure.

In further embodiments of the present invention, the exploration facility identifies a primary link from a hub to a bridge during the first scanning procedure in response to the received globally unique identifier matching a globally unique identifier of a bridge as stored in the hardware configuration data set.

In further embodiments of the present invention, the exploration facility identifies a self-coupling link between two hubs during the first scanning procedure in response to the received globally unique identifier matching a globally unique identifier of another hub as stored in the hardware configuration data set.

In further embodiments of the present invention, the exploration facility identifies an external coupling link between the hub and another system during the first scanning procedure in response to the received globally unique identifier not stored in the hardware configuration data set.

In further embodiments of the present invention, the exploration facility identifies a failover link between two bridges during the second scanning procedure in response to the received globally unique identifier matching a globally unique identifier of a bridge as stored in the hardware configuration data set.

All in all, embodiments of the invention disclosed herein do not need extra wires in cables for sensing the connections between the network elements and/or to explore the topology of the network. Due to the registers at ports on the endpoints of the connections no extra non high-speed signaling hardware is needed for transmitting the topology information. This gives the flexibility of using already available wiring units like standard InfiniBand cables in network topologies.

Additional the network elements need to be operational just at the transport layer which means the layer 2 of the OSI model. In the existing approaches which do not make use of extra wiring hardware for sensing topologies, network elements are obliged to be operated at least at the network layer which means the layer 3 of the OSI model.

Embodiments of the invention disclosed herein can be used to identify "isolated" network elements. The usage of both out-of-band and in-band mechanisms provide a dual-perspective on the network topology of the system having the ability of detecting any network elements not having connections to other detectable units or elements in the network.

The above, as well as additional purposes, features, and advantages of the present invention will become apparent in the following detailed written description.

BRIEF DESCRIPTION OF THE DRAWINGS

A preferred embodiment of the invention, as described in detail below, is shown in the drawings, in which.

DETAILED DESCRIPTION OF THE PREFERRED EMBODIMENTS

Figure 1:
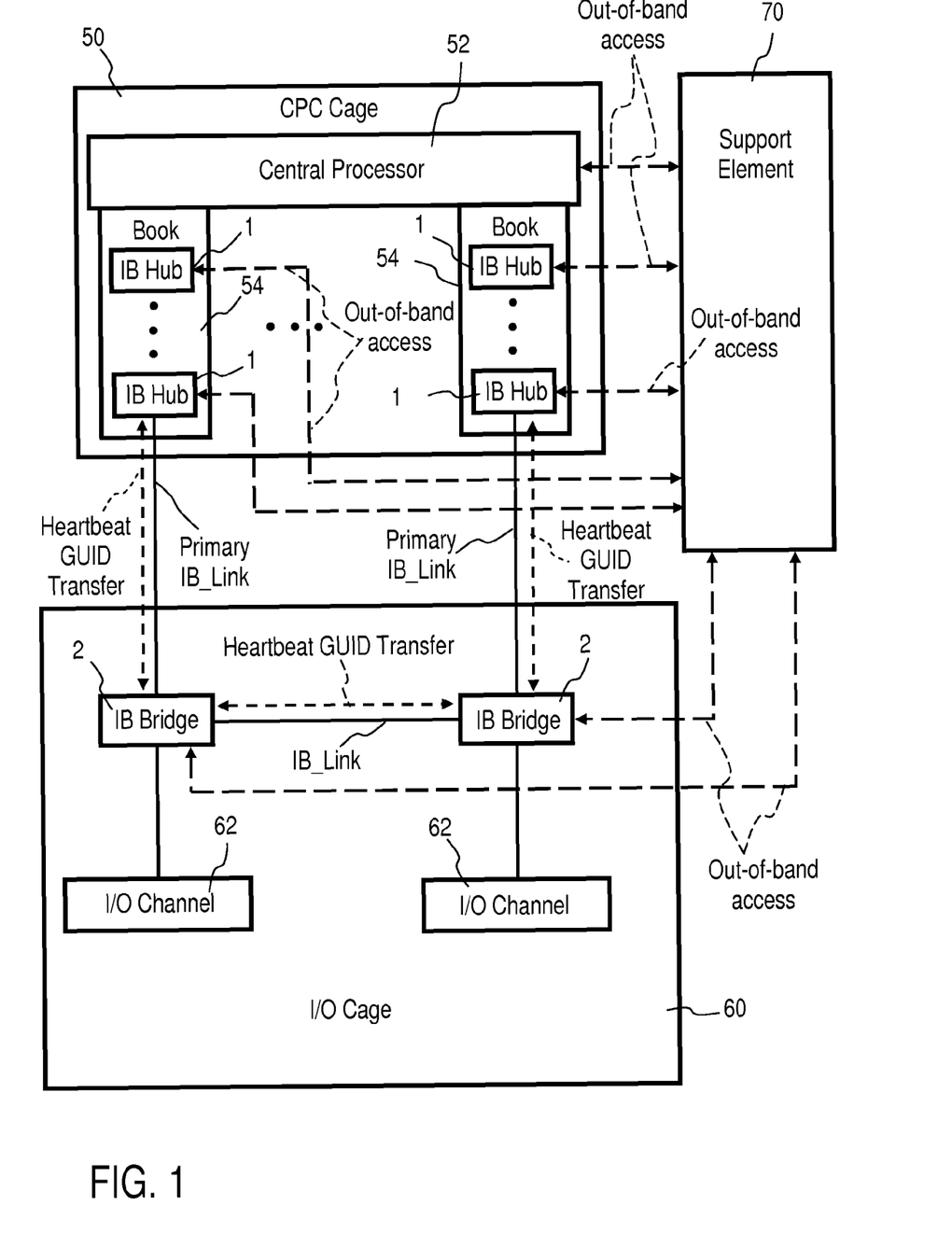
FIG. 1 is a schematic block diagram of an input/output expansion network in an expandable computer system using a method for connection exploration in the network, in accordance with an embodiment of the present invention.

FIG. 1 is a schematic block diagram of an input/output expansion network in an expandable computer system using a method for connection exploration in the network, in accordance with an embodiment of the present invention.

Referring to FIG. 1, the shown embodiment of an expandable computing system that implements an input/output (I/O) fan-out employs a central processor complex (CPC) cage 50 with at least one central processor 52 and an input/output (I/O) expansion network with a plurality of network elements 1, 2 using an InfiniBand (trademark) architecture to identify the different network elements 1, 2. In the shown expansion network a first type of network elements 1 comprises InfiniBand (IB) hubs arranged in books 54 and located in at least one CPC cage 50, and a second type of network elements 2 comprises InfiniBand (IB) bridges located in at least one I/O cage 60.

In the shown embodiment the IB hubs 1 are connected to the CPC via connectors and a fixed board wiring. Pairs of IB hubs 1 are connected with cables or via board wiring for self-coupling. The IB bridges 2 located in I/O cages 60 are attached with flexible cables to the IB hubs 1 located in CPC cages 50. Pairs of IB bridges 2 are connected with cables or via board wiring for fail-over redundancy. I/O channels 62 are connected to the IB bridges 2 via connectors to a back-plane in the I/O cages 60. In order to direct requests to the correct I/O channel 62, software/firmware needs to understand how to put together addresses so that they are routed to the correct I/O channel 62 by the I/O expansion network.

In a known embodiment of an I/O expansion network the routing and the associated addresses on a topology that is fixed by connector slots and board wiring, can be derived from the actual physical implementation of the wiring. However the flexible cables introduce ambiguity in the addressing, since it is not known a-priori which IB bridges 2 are connected to which IB hubs 1. This is also true for redundancy connections between IB bridges 2 and for self-coupling connections between IB hubs 1 if they are implemented as flexible cables.

To solve the ambiguity problem embodiments of the present invention use so-called "heartbeat-ordered sequences" emitted by ports of network elements 1, 2 of the I/O expansion network under InfiniBand architecture when operational at a link layer, which means the layer 2 of the OSI model. The InfiniBand architecture has introduced these heartbeat-ordered sequences so that the emitting port can detect unintentional signal reflections on non-terminated high-speed links that might otherwise be mistaken for signals from a remote InfiniBand port. Each heartbeat-ordered sequence contains a "globally unique identifier" (GUID) individually assigned to an emitting port of a network element 1, 2 and can be used to identify the different network elements like IB hubs 1 and IB bridges 2 and corresponding connections as soon as they are operational.

To implement the present invention an exploration facility shown in FIG. 1 uses a support element 70 to create a hardware configuration data set in an early step of an initial machine load by reading out the assigned GUIDs of all network elements 1, 2. An out-of-band mechanism is used to read out the GUIDs of the IB hubs 1 and IB bridges 2 via the support element 70. The support element 70 stores the hardware configuration data set containing the read out GUIDs in a database 3 shown in FIGS. 2 and 3. The database associated with the exploration facility according to embodiments of the present invention now contains information about the GUIDs of the InfiniBand ports of the IB hubs 1 and IB bridges 2 in addition to the information that was also collected in a conventional I/O expansion network.

Figure 2:
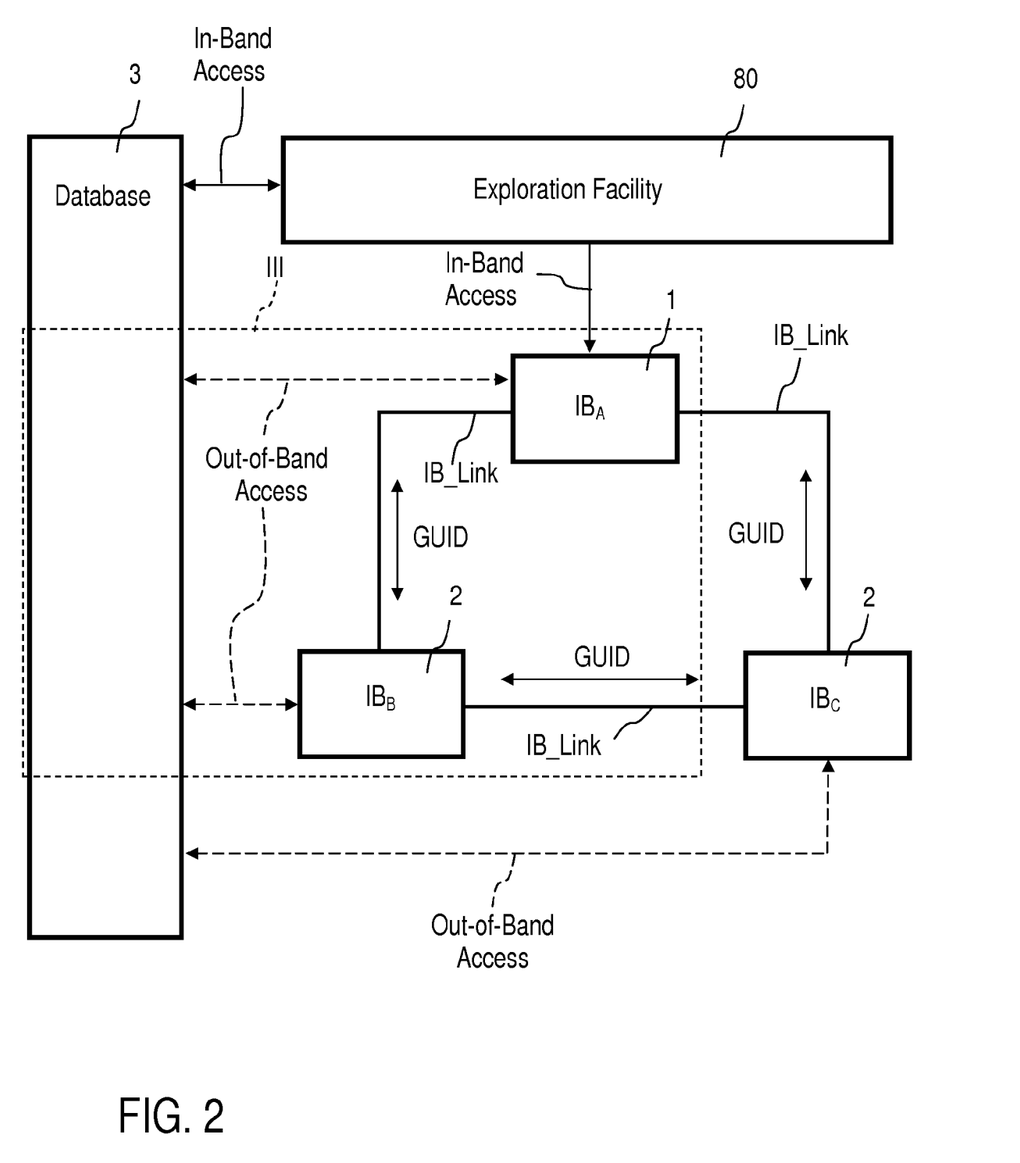
FIG. 2 is a schematic block diagram of an apparatus for connection exploration in a network, in accordance with an embodiment of the present invention.
Figure 3:
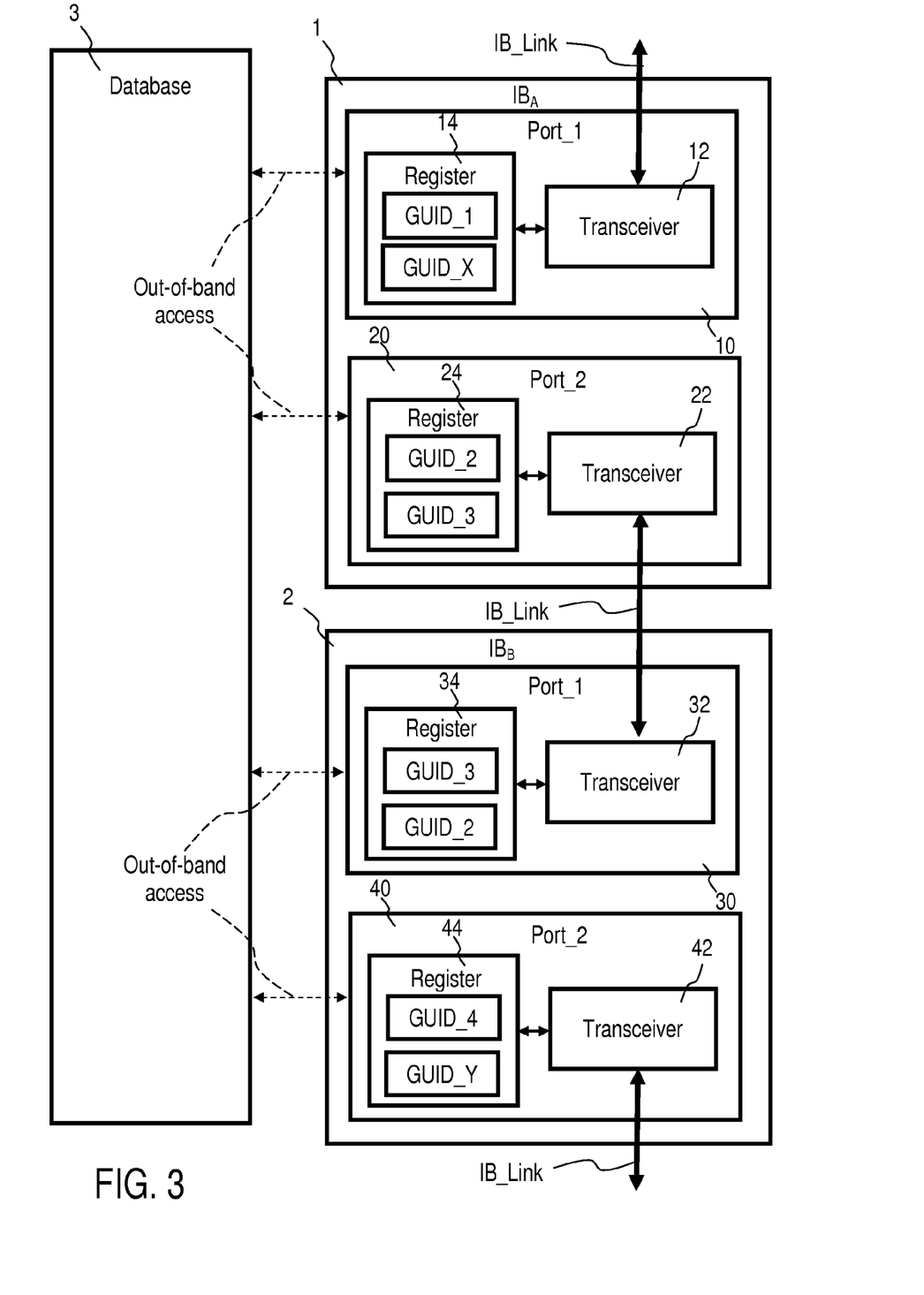
FIG. 3 is a detailed block diagram showing a detail III of the apparatus for connection exploration in a network shown in FIG. 2, in accordance with an embodiment of the present invention.

FIG. 2 is a schematic block diagram of an apparatus for connection exploration in a network, in accordance with an embodiment of the present invention, and FIG. 3 is a detailed block diagram showing a detail III of the apparatus for connection exploration in a network shown in FIG. 2.

Referring to FIG. 2, the shown embodiment of the apparatus for connection exploration in a network includes the exploration facility 80 and the database 3 wherein the exploration facility 80 reads out the GUIDs of all ports of the network elements 1, 2 via out-of-band mechanisms using the support element 70, and the read out GUIDs are stored in the database 3, as described before. Referring to FIG. 3, a first network element $IB_A$ representing an IB hub 1 includes two ports 10, 20, wherein a first port Port_1, 10 comprises a transceiver 12 and a register 14 storing the assigned globally unique identifier GUID_1 of the first port Port_1, 10, and wherein a second port Port_2, 20 comprises a transceiver 22 and a register 24 storing the assigned globally unique identifier GUID_2 of the second port Port_2, 20. A second network element $IB_B$ representing an IB Bridge 2 includes two ports 30, 40, wherein a first port Port_1, 30 comprises a transceiver 32 and a register 34 storing the assigned globally unique identifier GUID_3 of the first port Port_1, 30, and wherein a second port Port_2, 40 comprises a transceiver 42 and a register 44 storing the assigned globally unique identifier GUID_4 of the second port Port_2, 40. A connection IB_Link connects the transceiver 12 of the first port Port_1, 10 of the first network element $IB_A$ with a port of another network element not shown. A connection IB_Link connects the transceiver 22 of the second port Port_2, 20 of the first network element $IB_A$ with the transceiver 32 of the first port Port_1, 30 of the second network element $IB_B$. A connection IB_Link connects the transceiver 42 of the second port Port_2, 40 of the second network element $IB_B$ with a port of another network element not shown.

In the shown hierarchical network topology out-of-band methods, used for system wide chip initialization, initialize the IB hub 1 to allow in-band accesses from the exploration facility 80, and initialize the IB bridges 2 to operate their IB ports at OSI layer 2. The transferred GUIDs of the heartbeat-ordered sequences are captured by the transceivers 12, 22, 32, 42 at the receiving ports 10, 20, 30, 40 and stored in the corresponding registers 14, 24, 34, 44. For example, the transceiver 12 of the first port Port_1, 10 of the first network element $IB_A$ emits the assigned globally unique identifier GUID_1 to a port, not shown, and captures a globally unique identifier GUID_X emitted by said port, not shown, and stores the captured globally unique identifier GUID_X also in the register 14. The transceiver 22 of the second port Port_2, 20 of the first network element $IB_A$ emits the assigned globally unique identifier GUID_2 to the first port Port_1, 30 of the second network element $IB_B$ and captures the globally unique identifier GUID_3 emitted by the first port Port_1, 30 of the second network element $IB_B$, and stores the captured globally unique identifier GUID_3 also in the register 24. The transceiver 32 of the first port Port_1, 30 of the second network element $IB_B$ emits the assigned globally unique identifier GUID_3 to the second port Port_2, 20 of the first network element $IB_A$ and captures the globally unique identifier GUID_2 emitted by the second port Port_2, 20 of the first network element $IB_A$, and stores the captured globally unique identifier GUID_2 also in the register 34. The transceiver 42 of the second port Port_2, 40 of the second network element $IB_B$ emits the assigned globally unique identifier GUID_4 to a port, not shown, and captures a globally unique identifier GUID_Y emitted by said port, not shown, and stores the captured globally unique identifier GUID_Y also in the register 44.

The registers 14, 24, 34, 44 enable the exploration facility 80 to read out the received globally unique identifiers GUID_2, GUID_3, GUID_X, GUID_Y as long as the InfiniBand link stays up. As soon as the InfiniBand link drops, these received globally unique identifiers GUID_2, GUID_3, GUID_X, GUID_Y are cleared out of the registers 14, 24, 34, 44 prepared to receive new GUIDs as soon as the InfiniBand link comes up again. This behavior is required to prevent false identification of InfiniBand connections after reconfiguration of the flexible cable connections in the system. Via in-band accesses to the first network element $IB_A$ the exploration facility 80 reads out the captured GUIDs of the remote ports on network elements $IB_B$ and $IB_C$. By matching the GUIDs to the hardware configuration data set, the exploration facility 80 can now identify network elements $IB_B$ and $IB_C$ and records the information about the existing connections between the network elements $IB_A$ and $IB_B$, and the network elements $IB_A$ and $IB_C$. When the network elements $IB_A$, $IB_B$ and $IB_C$ are initialized so far that in-band accesses to the network elements $IB_B$ and $IB_C$ are possible by the exploration facility 80, it can identify further IB links between network elements 1, 2, e.g. the chaining link between the network elements $IB_B$ and $IB_C$, by reading out the captured remote GUIDs as they are transmitted by the heartbeat-ordered sequences on that IB link. If the hardware configuration dataset stored in the database 3 reports more InfiniBand ports than have been identified by their GUIDs after an exhaustive search, this method can be used to identify broken links.

In embodiments of the present invention the exploration facility 80 is able to identify different types of connections between the network elements 1, 2, including connectors and/or fixed board wiring and/or flexible cables. In a hierarchical structure of the network including multiple hubs 1 and multiple bridges 2 as network elements the exploration facility 80 is configured to scan the registers 14, 24 of all ports 10, 20 of the hub 1 for received globally unique identifiers GUID_X, GUID_3 in a first scanning procedure, and to scan the registers 34, 44 of all ports 30, 40 of the bridges 2 for received globally unique identifiers GUID_Y, GUID_2 in a second scanning procedure. The exploration facility 80 identifies, for example, a primary link from a hub 1 to a bridge 2 during the first scanning procedure in response to the received globally unique identifier GUID_3 matching a globally unique identifier GUID_3 of the bridge 2 as stored in the hardware configuration data set. The exploration facility 80 identifies a self-coupling link between two hubs 1 during the first scanning procedure in response to the received globally unique identifier matching a globally unique identifier of another hub 1 as stored in the hardware configuration data set. The exploration facility 80 identifies an external coupling link between said hub 1 and another system during the first scanning procedure in response to the received globally unique identifier not being stored in said hardware configuration data set.

The exploration facility 80 identifies a failover link between two bridges 2 during the second scanning procedure in response to the received globally unique identifier matching a globally unique identifier of a bridge 2 as stored in the hardware configuration data set.

The exploration facility 80 can take the form of an entirely hardware embodiment, an entirely software embodiment, or an embodiment containing both hardware and software elements. In a preferred embodiment, the exploration facility 80 is implemented in software, which includes but is not limited to firmware, resident software, microcode, etc. Also the facility to store received GUIDs can take the form of an entirely hardware embodiment like registers 14, 24, 34, 44, an entirely software embodiment, or an embodiment containing both hardware and software elements.

Figure 4:
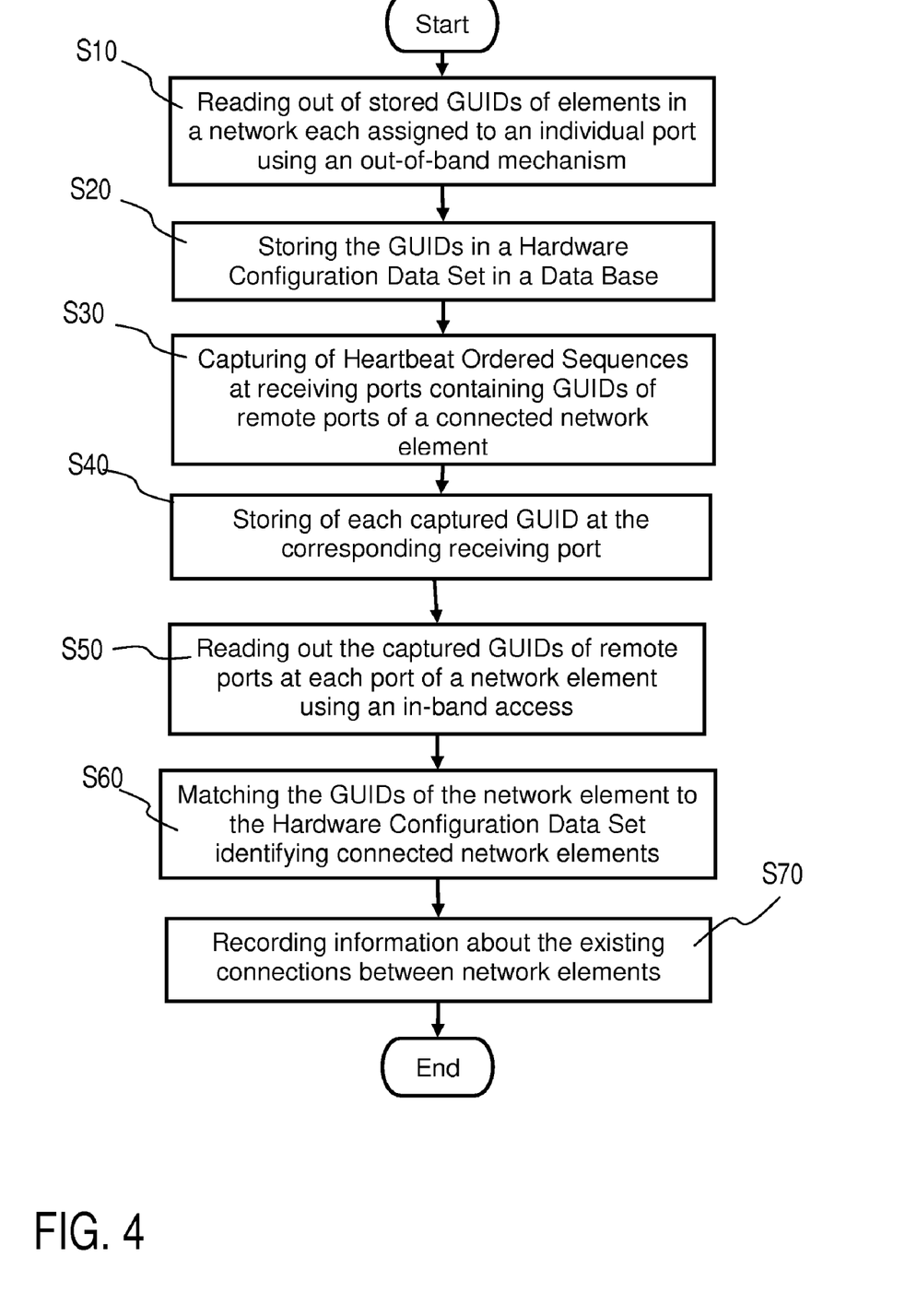
FIG. 4 is a flow chart of a method for connection exploration in a network, in accordance with an embodiment of the present invention.

FIG. 4 is a flow chart of a method for connection exploration in a network, in accordance with an embodiment of the present invention, used for example during initial machine load.

Referring to FIG. 4 and FIG. 3, the method for connection exploration in a network, wherein the network includes a plurality of network elements 1, 2 each including at least one port 10, 20, 30, 40 individually assigned to a globally unique identifier GUID_1, GUID_2, GUID_3, GUID_4, comprises creating the hardware configuration data set by reading out the assigned globally unique identifiers GUID_1, GUID_2, GUID_3, GUID_4 of all network elements 1, 2 during step S10 using an out-of-band mechanism, and storing the hardware configuration data set containing the read out globally unique identifiers GUID_1, GUID_2, GUID_3, GUID_4 in a database 3 during step S20. Connected ports 20, 30 of two network elements 1, 2 are transferring their globally unique identifiers GUID_2, GUID_3 over a corresponding connection IB_Link using heartbeat-ordered sequences. The transferred globally unique identifiers GUID_2, GUID_3 are captured at receiving ports 20, 30 during step S30. During step S40 the captured globally unique identifiers GUID_2, GUID_3 are each stored at a corresponding receiving port 20, 30. The transferred globally unique identifiers GUID_2, GUID_3 each stored at a port 20, 30 of the network elements 1, 2 are read out during step S50 using an in-band access. The read out globally unique identifiers GUID_2, GUID_3 are matched to the hardware configuration data set during step S60 to identify connected network elements 1, 2 and connections IB_Link between the connected network elements 1, 2. During step S70 information about existing connections IB_Link between the network elements 1, 2 are recorded.

The gathered topology information can be used to initialize hubs based on the attached network element, since different initializations are needed for hubs coupled with another hub and for hubs coupled with bridges. Additional the topology information can be used for reporting errors on a bridge or network elements attached to a bridge, since all network elements along the path to the network element in error need to be identified. The topology information of the bridge provides the path from the hub to the bridge and from bridge to bridge in case the failover link is used. To route I/O commands to I/O channels attached to a bridge the complete path to the channel is needed. Again the topology of the bridge provides the path form the hub to the bridge and from bridge to bridge in case the failover link is used. Also bridges without any connection can be identified and necessary repair actions can be triggered.

Computer systems provide functionality to concurrently repair hubs, bridges and IB links, e.g. cables, while the system is running. During a repair action the topology of the element to be repaired or attached elements should not be changed.

After having replaced the broken element, e.g. hubibridge/IB-link, the topology is rescanned. If the cables are not plugged like they were before, the user is can be asked to replug the cables. As the exploration works on link-layer level already there is no need to initialize the element or outgoing IB-links. So the user can replug the cables without any further interaction needed by firmware.

Usage of herein disclosed embodiments of the invention in exploring topology of I/O expansion networks using flexible cables has several advantages over the state of the art methods used. No extra wires in cables needed for the sensing of the topology. This gives the flexibility of using already available wiring units like standard InfiniBand cables in network topologies. The network elements need to be operational just at the transport layer, i.e. the layer 2 of the OSI model. It can be used to identify "isolated" network elements, wherein usage of both out-of-band and in-band mechanisms provide a dual-perspective on the network topology of the system having the ability of detecting any elements not having connections to other detectable units in the network.

Although particular embodiments have been shown and described herein, various modifications and extensions will be apparent to those skilled in the art.

APPENDIX

Reference List 1, 2 network element
3 database
10, 20, 30, 40 port
12, 22, 32, 42 transceiver
14, 24, 34, 44 register
GUID_1, GUID_2, GUID_3, GUID_4 globally unique identifier
GUID_X, GUID_Y globally unique identifier
50 CPC (central processor complex) cage
52 central processor
54 book
60 I/O cage
62 I/O channel
70 support element
80 exploration facility

What is claimed is:

1. A method for connection exploration in a network including a plurality of network elements each including at least one port, wherein a globally unique identifier is assigned to each individual port of said network elements, and wherein connected ports of two network elements transfer their globally unique identifiers over a corresponding connection using heartbeat-ordered sequences, said method comprising:
capturing said transferred globally unique identifiers at receiving ports;
storing each of said captured globally unique identifiers at a corresponding receiving port;
reading out said transferred globally unique identifiers stored at each port of said network elements using an in-band access;
matching said read out globally unique identifiers to a hardware configuration data set to identify connected network elements and connections between said connected network elements; and
recording information about existing connections between said network elements;
wherein in a hierarchical network different types of connections can be identified in different scanning procedures;
wherein in a first scanning procedure all ports of first type network elements are scanned for received globally unique identifiers;
wherein in a second scanning procedure all ports of second type network elements are scanned for received globally unique identifiers; and
wherein a self-coupling link between two first type network elements in said hierarchical network is identified during said first scanning procedure in response to said received globally unique identifier matching a globally unique identifier of a first type network element as stored in said hardware configuration data set.

2. The method of claim 1 further comprising:
creating said hardware configuration data set by reading out said assigned globally unique identifiers of all network elements using an out-of-band mechanism; and
storing said hardware configuration data set containing said read out globally unique identifiers in a database.

3. The method according to claim 1, wherein said in-band access is enabled by side-band methods initializing said network elements.

4. The method according to claim 1, wherein said transferred globally unique identifiers stored at corresponding ports of said network elements are read out in response to a staying up of said in-band access.

5. The method according to claim 4, wherein said transferred globally unique identifiers stored at said corresponding ports of said network elements are cleared in response to a dropping of said in-band access.

6. The method according to claim 1, wherein a primary link from a first type network element to a second type network element in said hierarchical network is identified during said first scanning procedure in response to said received globally unique identifier matching a globally unique identifier of a second type network element as stored in said hardware configuration data set.

7. A method for connection exploration in a network including a plurality of network elements each including at least one port, wherein a globally unique identifier is assigned to each individual port of said network elements, and wherein connected ports of two network elements transfer their globally unique identifiers over a corresponding connection using heartbeat-ordered sequences, said method comprising:
capturing said transferred globally unique identifiers at receiving ports;
storing each of said captured globally unique identifiers at a corresponding receiving port;
reading out said transferred globally unique identifiers stored at each port of said network elements using an in-band access;
matching said read out globally unique identifiers to a hardware configuration data set to identify connected network elements and connections between said connected network elements; and
recording information about existing connections between said network elements;
wherein in a hierarchical network different types of connections can be identified in different scanning procedures;
wherein in a first scanning procedure all ports of first type network elements are scanned for received globally unique identifiers;
wherein in a second scanning procedure all ports of second type network elements are scanned for received globally unique identifiers; and
wherein an external coupling link between said first type network element and another system is identified during said first scanning procedure in response to said received globally unique identifier not being stored in said hardware configuration data set.

8. A method for connection exploration in a network including a plurality of network elements each including at least one port, wherein a globally unique identifier is assigned to each individual port of said network elements, and wherein connected ports of two network elements transfer their globally unique identifiers over a corresponding connection using heartbeat-ordered sequences, said method comprising:
   capturing said transferred globally unique identifiers at receiving ports;
   storing each of said captured globally unique identifiers at a corresponding receiving port;
   reading out said transferred globally unique identifiers stored at each port of said network elements using an in-band access;
   matching said read out globally unique identifiers to a hardware configuration data set to identify connected network elements and connections between said connected network elements; and
   recording information about existing connections between said network elements;
   wherein in a hierarchical network different types of connections can be identified in different scanning procedures;
   wherein in a first scanning procedure all ports of first type network elements are scanned for received globally unique identifiers;
   wherein in a second scanning procedure all ports of second type network elements are scanned for received globally unique identifiers; and
   wherein a failover link between two second type network elements is identified during said second scanning procedure in response to said received globally unique identifier matching a globally unique identifier of a second type network element as stored in said hardware configuration data set.

9. An apparatus for connection exploration in a network including a plurality of network elements each including at least one port, comprising:
   a support element that assigns a globally unique identifier to each individual port of said network elements;
   an exploration facility configured to force transceivers of connected ports of two network elements to transfer their assigned globally unique identifiers over a corresponding connection using heartbeat-ordered sequences;
   said transferred globally unique identifiers are captured at receiving ports, and stored in corresponding registers at said receiving ports;
   said exploration facility configured to read out said transferred globally unique identifiers stored in said registers using an in-band access to each port of said network elements;
   said exploration facility further configured to match said read out globally unique identifiers to a hardware configuration data set stored in a database to identify connected network elements and connections between said connected network elements;
   said exploration facility further configured to record information about existing connections between said network elements;
   said network having a hierarchical structure including multiple hubs and multiple bridges as said network elements, and uses an InfiniBand physical layer;
   said hubs connected to a central processor complex (CPC) via connectors and a fixed board wiring;
   wherein pairs of hubs are connected via cables or via board wiring for self-coupling;
   said bridges attached with flexible cables to said hubs;
   wherein pairs of bridges are connected with cables or via board wiring for failover redundancy; and
   wherein said exploration facility identifies a self-coupling link between two hubs during said first scanning procedure in response to said received globally unique identifier matching a globally unique identifier of another hub as stored in said hardware configuration data set.

10. The apparatus of claim 9, wherein said support element is configured to create said hardware configuration data set in an early step of an initial machine load by reading out said assigned globally unique identifiers of all network elements using an out-of-band mechanism, and to store said hardware configuration data set containing said read out globally unique identifiers in said database.

11. The apparatus according to claim 9, wherein side-band methods initializing said network elements enable said in-band access of said exploration facility to said ports and said hardware configuration data set.

12. The apparatus according to claim 9, wherein said exploration facility is further configured to read out transferred globally unique identifiers stored in registers at corresponding ports of said network elements in response to said in-band access, and to clear said registers storing said transferred globally unique identifiers in response to a dropping of said in-band access.

13. The apparatus according to claim 9, wherein said exploration facility is further configured to identify different types of connections between said network elements, including connectors and/or fixed board wiring and/or flexible cables.

14. The apparatus according to claim 9, wherein said exploration facility identifies a primary link from a hub to a bridge during said first scanning procedure in response to said received globally unique identifier matching a globally unique identifier of a bridge as stored in said hardware configuration data set.

15. An apparatus for connection exploration in a network including a plurality of network elements each including at least one port, comprising:
   a support element that assigns a globally unique identifier to each individual port of said network elements;
   an exploration facility configured to force transceivers of connected ports of two network elements to transfer their assigned globally unique identifiers over a corresponding connection using heartbeat-ordered sequences;
   wherein said transferred globally unique identifiers are captured at receiving ports, and stored in corresponding registers at said receiving ports;
   said exploration facility is configured to read out said transferred globally unique identifiers stored in said registers using an in-band access to each port of said network elements;
   said exploration facility is further configured to match said read out globally unique identifiers to a hardware configuration data set stored in a database to identify connected network elements and connections between said connected network elements;
   said exploration facility is further configured to record information about existing connections between said network elements;

said network having a hierarchical structure including multiple hubs and multiple bridges as said network elements, and uses an InfiniBand physical layer;
said hubs connected to a central processor complex (CPC) via connectors and a fixed board wiring;
wherein pairs of hubs are connected via cables or via board wiring for self-coupling;
said bridges attached with flexible cables to said hubs;
wherein pairs of bridges are connected with cables or via board wiring for failover redundancy; and
wherein said exploration facility is further configured to scan said registers of all ports of said multiple hubs for received globally unique identifiers in a first scanning procedure, and to scan said registers of all ports of said multiple bridges for received globally unique identifiers in a second scanning procedure;
wherein said exploration facility identifies an external coupling link between said hub and another system during said first scanning procedure in response to said received globally unique identifier not being stored in said hardware configuration data set.

16. An apparatus for connection exploration in a network including a plurality of network elements each including at least one port, comprising:
a support element that assigns a globally unique identifier to each individual port of said network elements;
an exploration facility configured to force transceivers of connected ports of two network elements to transfer their assigned globally unique identifiers over a corresponding connection using heartbeat-ordered sequences;
wherein said transferred globally unique identifiers are captured at receiving ports, and stored in corresponding registers at said receiving ports;
said exploration facility is configured to read out said transferred globally unique identifiers stored in said registers using an in-band access to each port of said network elements;
said exploration facility is further configured to match said read out globally unique identifiers to a hardware configuration data set stored in a database to identify connected network elements and connections between said connected network elements;
said exploration facility is further configured to record information about existing connections between said network elements;
said network having a hierarchical structure including multiple hubs and multiple bridges as said network elements, and uses an InfiniBand physical layer;
said hubs connected to a central processor complex (CPC) via connectors and a fixed board wiring;
wherein pairs of hubs are connected via cables or via board wiring for self-coupling;
said bridges attached with flexible cables to said hubs;
wherein pairs of bridges are connected with cables or via board wiring for failover redundancy; and
wherein said exploration facility is further configured to scan said registers of all ports of said multiple hubs for received globally unique identifiers in a first scanning procedure, and to scan said registers of all ports of said multiple bridges for received globally unique identifiers in a second scanning procedure;
wherein said exploration facility identifies a failover link between two bridges during said second scanning procedure in response to said received globally unique identifier matching a globally unique identifier of a bridge as stored in said hardware configuration data set.

* * * * *